United States Patent
Kim et al.

(10) Patent No.: US 9,721,139 B2
(45) Date of Patent: Aug. 1, 2017

(54) FINGERPRINT DETECTION SENSOR AND FINGERPRINT DETECTION SYSTEM COMPRISING THE SAME

(71) Applicant: Samsung Electronics Co., Ltd., Suwon-si, Gyeonggi-do (KR)

(72) Inventors: Jongseok Kim, Hwaseong-si (KR); Jungwoo Kim, Hwaseong-si (KR); Seokhwan Chung, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 14/820,825

(22) Filed: Aug. 7, 2015

(65) Prior Publication Data

US 2016/0063295 A1   Mar. 3, 2016

(30) Foreign Application Priority Data

Aug. 29, 2014   (KR) .................... 10-2014-0114523

(51) Int. Cl.
*G06K 9/00* (2006.01)

(52) U.S. Cl.
CPC ............ *G06K 9/0002* (2013.01); *G06K 9/001* (2013.01)

(58) Field of Classification Search
CPC ............ G06F 21/32; G06F 2203/0338; G06K 9/0002; G06K 9/001
USPC .......................................... 382/115, 124–127
See application file for complete search history.

(56) References Cited

U.S. PATENT DOCUMENTS

| | | | | |
|---|---|---|---|---|
| 5,448,649 | A | * | 9/1995 | Chen ................... G06K 9/00046 356/71 |
| 6,259,804 | B1 | | 7/2001 | Setlak et al. |
| 6,647,133 | B1 | * | 11/2003 | Morita ............... G06K 9/00013 340/562 |
| 6,785,408 | B1 | | 8/2004 | Setlak et al. |
| 7,141,918 | B2 | * | 11/2006 | Scott .................. G06K 9/00885 310/317 |
| 7,358,514 | B2 | | 4/2008 | Setlak et al. |
| 7,783,088 | B2 | | 8/2010 | Shinzaki et al. |
| 7,822,239 | B2 | | 10/2010 | Chou |
| 8,139,827 | B2 | * | 3/2012 | Schneider ............. G01N 29/06 382/123 |
| 8,374,407 | B2 | | 2/2013 | Benkley et al. |
| 9,229,102 | B1 | * | 1/2016 | Wright ................ G01S 13/888 |
| 2007/0258628 | A1 | * | 11/2007 | Schneider ............ A61B 5/1172 382/124 |

(Continued)

FOREIGN PATENT DOCUMENTS

| | | | |
|---|---|---|---|
| JP | 3815788 | B2 | 8/2006 |
| JP | 4732990 | B2 | 7/2011 |

(Continued)

*Primary Examiner* — Daniel Mariam
(74) *Attorney, Agent, or Firm* — Harness, Dickey & Pierce, P.L.C.

(57) ABSTRACT

Example embodiments disclose a fingerprint recognition sensor and a fingerprint recognition system. The fingerprint recognition sensor may include a pad configured to apply a first wave signal having multi-frequency characteristics to an object, a signal applying electrode configured to transmit the first wave signal having multi-frequency characteristics to the pad and a signal receiving electrode configured to receive a reflection wave signal from the object to the pad based on the first wave signal.

16 Claims, 4 Drawing Sheets

(56) References Cited

U.S. PATENT DOCUMENTS

| | | |
|---|---|---|
| 2008/0205714 A1 | 8/2008 | Benkley et al. |
| 2008/0219521 A1 | 9/2008 | Benkley et al. |
| 2008/0226132 A1 | 9/2008 | Gardner |
| 2009/0039449 A1 | 2/2009 | Chou |
| 2009/0154779 A1 | 6/2009 | Satyan et al. |
| 2009/0155456 A1 | 6/2009 | Benkley et al. |
| 2010/0113952 A1* | 5/2010 | Raguin ............... G06K 9/0012 600/509 |
| 2012/0206586 A1 | 8/2012 | Gardner |
| 2012/0212322 A1 | 8/2012 | Idsoe |
| 2012/0308092 A1 | 12/2012 | Benkley et al. |
| 2013/0194071 A1 | 8/2013 | Slogedal et al. |
| 2013/0240022 A1 | 9/2013 | Sewell et al. |
| 2014/0043138 A1 | 2/2014 | Idsoe |
| 2014/0105469 A1 | 4/2014 | Setlak et al. |
| 2014/0219521 A1* | 8/2014 | Schmitt ............... G06K 9/0002 382/124 |
| 2015/0226777 A1* | 8/2015 | Qian .................... G01R 29/10 343/703 |

FOREIGN PATENT DOCUMENTS

| | | |
|---|---|---|
| KR | 20080102124 A | 11/2008 |
| WO | WO-2007060178 A1 | 5/2007 |

\* cited by examiner

FINGERPRINT DETECTION SENSOR AND FINGERPRINT DETECTION SYSTEM COMPRISING THE SAME

RELATED APPLICATIONS

This application claims the benefit of Korean Patent Application No. 10-2014-0114523, filed on Aug. 29, 2014, in the Korean Intellectual Property Office, the disclosure of which is incorporated herein in its entirety by reference.

BACKGROUND

1. Field

The present disclosure relates to a fingerprint detection sensor and a fingerprint detection system comprising the fingerprint detection sensor.

2. Description of the Related Art

As an economy and society develop, a payment method develops as well and thus new payment methods such as a payment using credit cards or an offline payment using electronic money (e-money) have been introduced. Also, the management of personal information has arisen as a social issue. A typical security method of inputting an ID and a password becomes insufficient to confirm personal information and keep security.

Accordingly, in a situation using personal information, detecting a particular signal to confirm identity of a person and interpret the signal while keeping security may be used. A personal verification method using biometric recognition is mainly used in a security system. Along those methods, a personal verification method using fingerprint recognition is most widely used.

A fingerprint recognition system includes a fingerprint input device, that is, a fingerprint recognition sensor, and a signal processing algorithm. For a reliable fingerprint recognition system having a high recognition rate and a low error rate, a high quality image of a fingerprint and thus development of a high performance fingerprint recognition sensor is used.

SUMMARY

Provided is a fingerprint recognition sensor which recognizes a fingerprint of an object to be tested by using fingerprint data that is obtained by applying a multi-wavelength signal to a fingerprint area of the object to be tested.

Provided is a fingerprint recognition system including the fingerprint recognition sensor.

Additional example embodiments will be set forth in part in the description which follows and, in part, will be apparent from the description, or may be learned by practice of example embodiments.

According to an example embodiment, a fingerprint recognition sensor includes a pad configured to apply a first wave signal having multi-frequency characteristics to an object, a signal applying electrode configured to transmit the first wave signal having multi-frequency characteristics to the pad, and a signal receiving electrode configured to receive a reflection wave signal from the object to the pad based on the first wave signal.

The pad may have a width smaller than an interval between ridge regions, the ridge regions being protruding areas of the object.

The pad may be connected to the signal applying electrode and the signal receiving electrode via a pad electrode.

The pad may comprise a plurality of pads that contact the object.

According to another example embodiment, a fingerprint recognition system includes a wave generator configured to generate a multi-frequency signal, an antenna configured to receive the multi-frequency signal, and an analyzer configured to analyze a reflection signal received from the antenna.

The antenna may include a plurality of pads that contact an object.

The pad may have a width smaller than an interval between ridge regions, the ridge regions being protruding areas of a fingerprint of the object.

The fingerprint recognition system may further include a band pass filter configured to filter one of the multi-frequency signal and the reflection signal.

The fingerprint recognition system may further include an amplifier configured to amplify one of the multi-frequency signal and the reflection signal.

The fingerprint recognition system may further include a controller that controls the wave generator and the analyzer.

The wave generator may include at least one of a plurality of wave generator elements configured to that modulate a wave signal.

The wave generator comprises at least one of a plurality of wave generator elements configured to generate wave signals having different frequency characteristics.

The analyzer is configured to may analyze fingerprint data of an object to be tested by using at least one of a value of the reflection signal and a signal return loss value.

In at least one example embodiment, the pad includes a plurality of pads that do not contact the object.

BRIEF DESCRIPTION OF THE DRAWINGS

These and/or other aspects will become apparent and more readily appreciated from the following description of example embodiments, taken in conjunction with the accompanying drawings in which.

DETAILED DESCRIPTION

Figure 1:
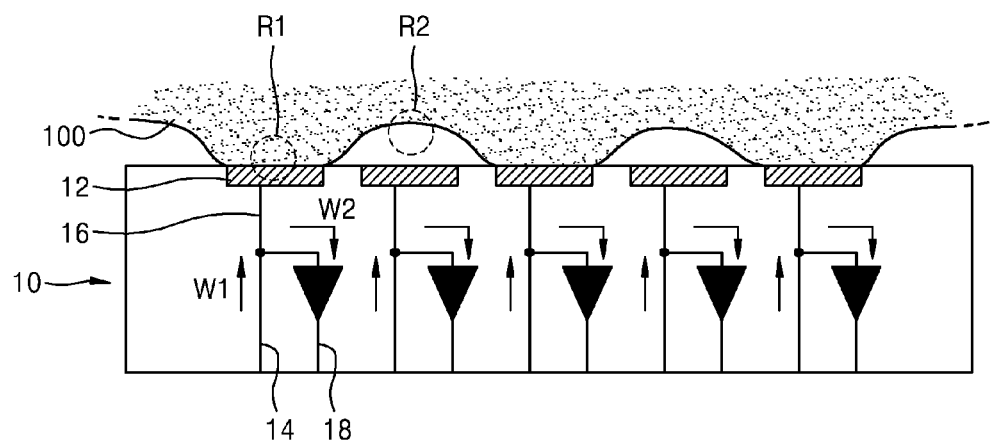
FIG. 1 illustrates a fingerprint recognition sensor according to an example embodiment.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., nonvolatile memories universal flash memories, universal flash memory controllers, nonvolatile memories and memory controllers, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

FIG. 1 illustrates a fingerprint recognition sensor 10 according to an example embodiment.

Referring to FIG. 1, the fingerprint recognition sensor 10 may include a pad 12 that applies a wave signal W1 having multi-frequency characteristics to an object 100 to be tested and a signal applying electrode 14 that transmits the wave signal W1 to the pad 12. The fingerprint recognition sensor 10 may further include a signal receiving electrode 18 that receives, through the pad 12, a reflection wave signal W2 generated by being reflected from the object 100 to be tested. The pad 12 is connected to the signal applying electrode 14 and the signal receiving electrode 18 via a pad electrode 16. The pad electrode 16 and the pad 12 may be an antenna portion. The pad 12 may include a plurality of the pads 12 that contact or do not contact the object 100 to be tested.

The object 100 to be tested may be a fingerprint area of a human body. A fingerprint area of the object 100 to be tested may be divided into a ridge region R1 that is a skin area relatively protruding from the surrounding area and a valley region R2 that is a skin area between the ridge regions R1. The pad 12 may have a width less than an interval between the ridge regions R1 of the object 100 to be tested, for example, a width or size of several micrometers to several hundreds of micrometers. The ridge region R1 of the object 100 to be tested may directly/indirectly contact the pad 12, whereas the valley region R2 does not contact the pad 12. An empty gap between the valley region R2 and the pad may be filled with air or sweat. Electrodes 14, 16, and 18 of the fingerprint recognition sensor 10 may be formed in an insulating or dielectric layer. The pad 12 may be exposed outside the fingerprint recognition sensor 10 to contact the object 100 to be tested. The electrodes 14, 16, and 18 may be formed of a conductive material such as a metal, an alloy, a conductive metal oxide, a conductive metal nitride, or a conductive polymer. The pad 12 may include a conductive material layer and may further include a protection layer formed on a surface of the conductive material layer. The conductive material layer may be formed of a conductive material such as a metal, an alloy, a conductive metal oxide, a conductive metal nitride, or a conductive polymer. The protective layer may be formed of an organic material, a polymer, a silicon oxide, or a silicon nitride.

The fingerprint recognition sensor 10 may include a plurality of the pads 12. The wave signal W1 transmitted to the pads 12 through the signal applying electrode 14 may be applied to the object 100 to be tested. The wave signal W1 applied to the object 100 to be tested may be reflected from the object 100 to be tested and thus the reflection wave signal W2 may be transmitted to the signal receiving electrode 18 through the pads. In doing so, the pad 12 that applies the wave signal W1 and the pad 12 that receives the reflection wave signal W2 may be identical to or different from each other.

Figure 2A:
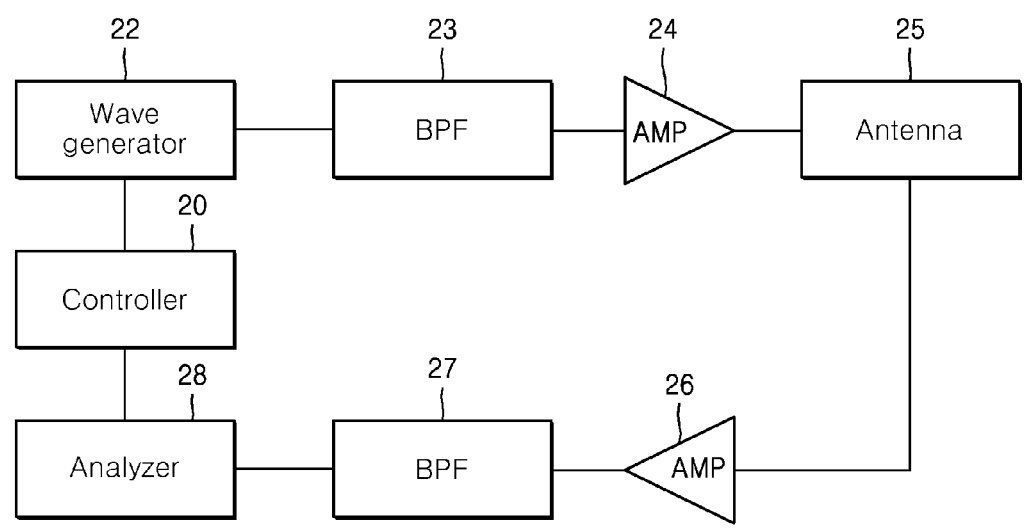
FIG. 2A is a block diagram schematically illustrating a structure of a fingerprint recognition system including a fingerprint recognition sensor according to another example embodiment.

FIG. 2A is a block diagram schematically illustrating a structure of a fingerprint recognition system including a fingerprint recognition sensor according to an example embodiment.

Referring to FIGS. 1 and 2A, the fingerprint recognition system transmits the wave signal having multi-frequency characteristics and generated by a wave generator 22 to an antenna 25 via the signal applying electrode 14. The antenna 25 may obtain fingerprint data and may include the pad electrode 16 and the pad 12. A multi-frequency signal generated by the wave generator 22 may be filtered by a band pass filter (BPF) 23 and may be amplified by an amplifier (AMP) 24 so as to be transmitted to the antenna 25. In a fingerprint portion of the object 100 to be tested, reflection signals having different characteristics with respect to the multi-frequency signal may be generated due to a difference in the characteristics between the ridge region R1 and the valley region R2. The reflection signal generated by the antenna 25 may be amplified and filtered respectively through an amplifier 26 and a BPF 27. The reflection signal is analyzed by an analyzer 28 and thus fingerprint information of the object 100 to be tested may be obtained. The wave generator 22 and the analyzer 28 may be operated through the controller 20. A user may operate the controller 20 to control the wave signal information generated by the wave generator 22.

The controller 20 may be hardware, firmware, hardware executing software or any combination thereof. When the controller 20 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the dual bandpass filter 113. As stated above, CPUs, DSPs, ASICs and FPGAs may generally be referred to as processing devices.

In the event the controller 20 is a processor executing software, a processor is configured as a special purpose machine to execute the software, stored in a storage medium, to perform the functions of the controller 20.

Biometric data of the object 100 to be tested that is obtained by using the analyzer 28 may be compared with previously stored biometric data.

Figure 2B:
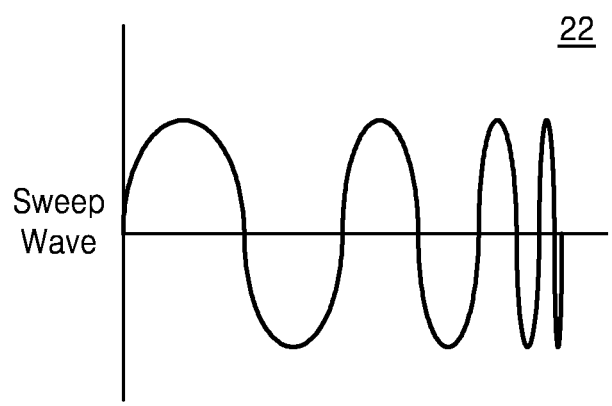
FIG. 2B is a graph showing a wave signal applied to an object to be tested by a fingerprint recognition sensor according to another example embodiment.

FIG. 2B is a graph showing a wave signal applied to an object to be tested by a fingerprint recognition sensor according to another example embodiment.

Referring to FIG. 2B, in the fingerprint recognition sensor 10, a wave signal applied to the object 100 to be tested may have multi-frequency characteristics and sweep wave signal characteristics. In other words, the wave signal generated by the wave generator 22 may have a frequency or wavelength that continuously varies and, as illustrated in FIG. 2B, the frequency of the wave signal may continuously increase. However, the above description is an example and the frequency of the wave signal may continuously decrease. Also, the frequency of the wave signal may gradually increase and then decrease, or may decrease and then increase. For example, the wave signal generated by the wave generator 22 may vary in a range of several kilohertz (kHz) to hundreds of megahertz (MHz). In the fingerprint recognition sensor 10, the wave signal applied to the object 100 to be tested may have various frequency or wavelength characteristics. Clearer fingerprint information of the object 100 to be tested may be obtained by analyzing various reflection signals reflected from the ridge region R1 and the valley region R2 of the object 100 to be tested, according to the respective frequencies. To generate the wave signal having the multi-frequency characteristics, the wave generator 22 may modulate the frequency of the wave signal by using one wave generator.

Figure 2C:
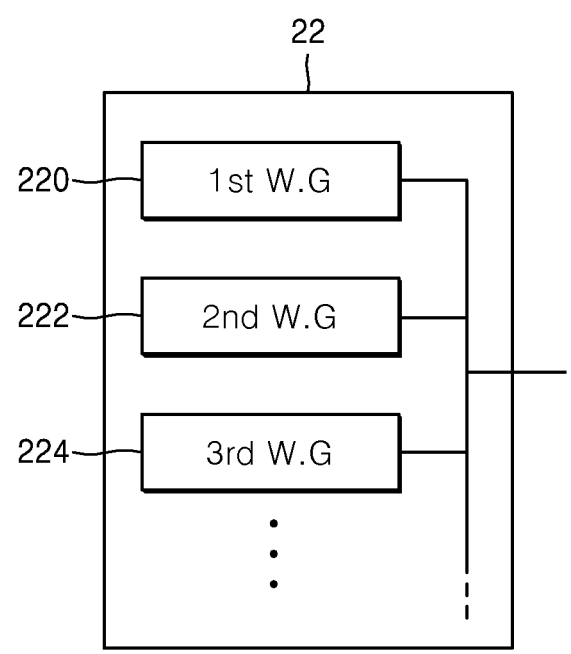
FIG. 2C illustrates a structure of generating a multi-wavelength signal in a wave generator of a fingerprint recognition system according to another example embodiment.

FIG. 2C illustrates a structure of generating a multi-wavelength signal in a wave generator of a fingerprint recognition system according to another example embodiment.

Referring to FIGS. 1, 2A, and 2C, the wave generator 22 may include a plurality of wave generators (1st W.G, 2nd W.G, 3rd W.G . . . ) such as a first wave generator (1st W.G) 220, a second wave generator (2nd W.G) 222, a third wave generator (3rd W.G) 224, etc. The wave generators (1st W.G, 2nd W.G, 3rd W.G . . . ) may respectively generate wave signals having different wavelength characteristics. The wave signals may be sequentially transmitted to the pad 12 through the signal applying electrode 14 by using the wave generators (1st W.G, 2nd W.G, 3rd W.G . . . ).

In the fingerprint recognition system illustrated in FIG. 2B, a wave signal having multi-frequency characteristics may be generated by using a single wave generator. Also, as illustrated in FIG. 2C, a wave signal having multi-frequency characteristics may be generated by using at least one of the wave generator (1st W.G, 2nd W.G, 3rd W.G . . . ) that may generate wave signals having different frequency characteristics. As such, since the fingerprint of the object 100 to be tested is analyzed by using a wave signal having multi-frequency characteristics, reliability of fingerprint recognition may be secured.

Figure 3:
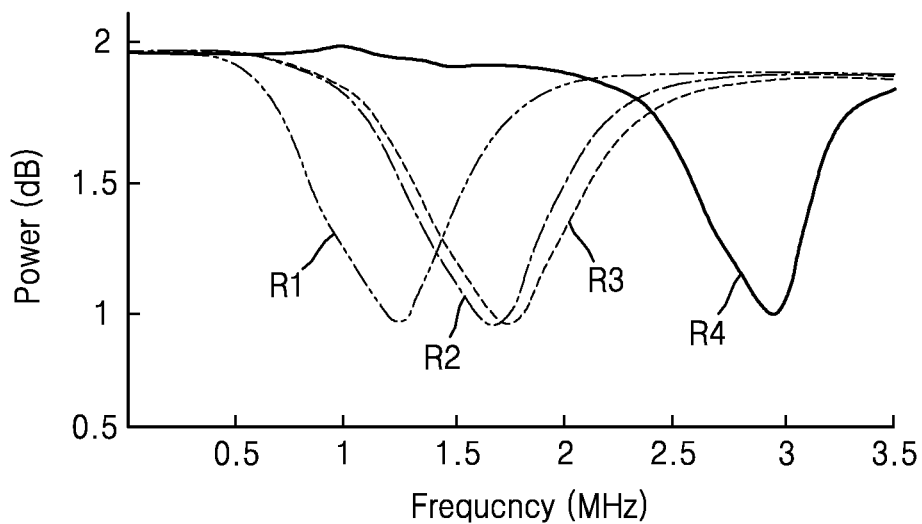
FIG. 3 is a graph showing data measured through a fingerprint recognition sensor according to another example embodiment.

FIG. 3 is a graph showing data measured through a fingerprint recognition sensor according to another example embodiment. In the graph, as illustrated in FIG. 1, the horizontal axis indicates a multi-frequency value of the wave signal W1 applied to the object 100 to be tested through the pad electrode 16 and the pad 12, and the vertical axis denotes a value of the reflection signal reflected from the object 100 to be tested.

Referring to FIGS. 1 and 3, it may be seen that the ridge region R1 and the valley region R2 of the object 100 to be tested are clearly distinguished from each other. The valley region R2 of the fingerprint area of the object 100 to be tested may be a surface area that does not contact the pad 12. For example, the valley region R2 may be an area that does not directly contact the pad 12 and a space therebetween may be an air area. The space between the valley region R2 and the pad 12 may be filled with sweat or oil other than air. In this case, the reflection signal may have different reflection signal characteristics such as R3 or R4 of FIG. 3. The fingerprint recognition sensor 10 may use a wave signal having multi-frequency characteristics, and the reflection signal may have various biometric data. In other words, as illustrated in FIG. 3, the reflection signal may have different reflection signal characteristics according to not only the ridge region R1 or the valley region R2 but also the existence of other foreign materials such as sweat or oil, with respect to the fingerprint area of the object 100 to be tested.

As described above, various pieces of information data may be obtained. Also, various analysis methods may be used to analyze the information data. For example, a method such as data pattern analysis, grouping, etc. may be used.

Figure 4:
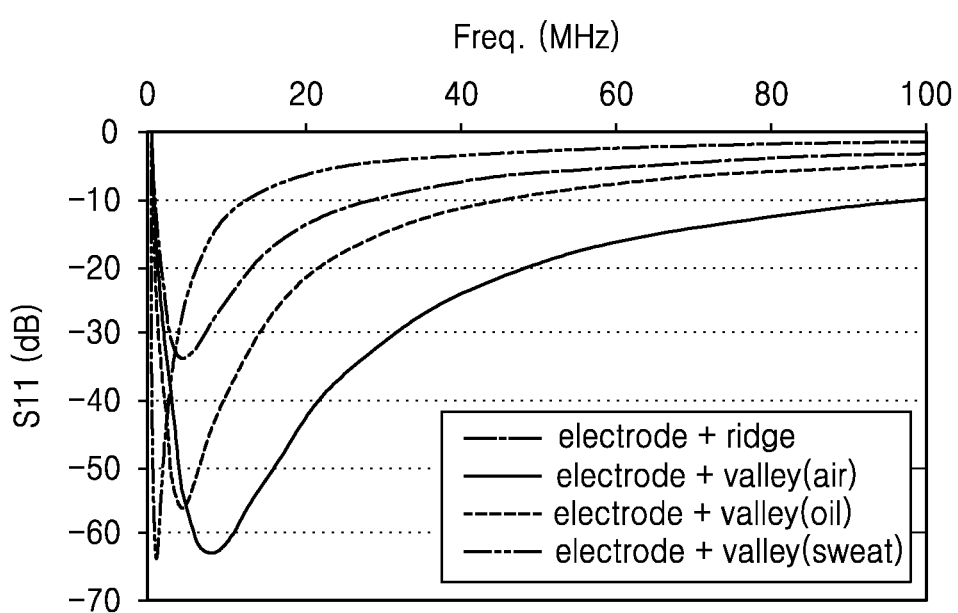
FIG. 4 is a graph showing fingerprint data measured through a fingerprint recognition sensor according to another example embodiment.

FIG. 4 is a graph showing fingerprint data measured through a fingerprint recognition sensor according to another example embodiment. In the graph of FIG. 4, the horizontal axis denotes a multi-frequency value of the wave signal W1 applied to the object 100 to be tested through the pad electrode 16 and the pad 12 illustrated in FIG. 1, whereas the vertical axis denotes a return loss value S11 of the reflection signal reflected from the object 100 to be tested. This may be identically applied to the graph shown in FIGS. 5A and 5B.

Referring to FIGS. 1 and 4, a return loss value (electrode+ridge) of the reflection signal obtained from the ridge region R1 of the object 100 to be tested may be obtained. A return loss value of the reflection signal obtained from the valley region R2 of the object 100 to be tested may be obtained in three types. The return loss value of the reflection signal obtained from the valley region R2 of the object 100 to be tested may be divided according to a type of a material filling the space between the valley region R2 and the pad 12 into air (electrode+valley(air)), oil (electrode+valley(oil)), and sweat (electrode+valley(sweat)). It may be seen that different signal return loss value graphs may be obtained according to a portion of the object 100 to be tested contacting the pad 12 and the material interposed between the pad 12 and the object 100 to be tested.

Figure 5A:
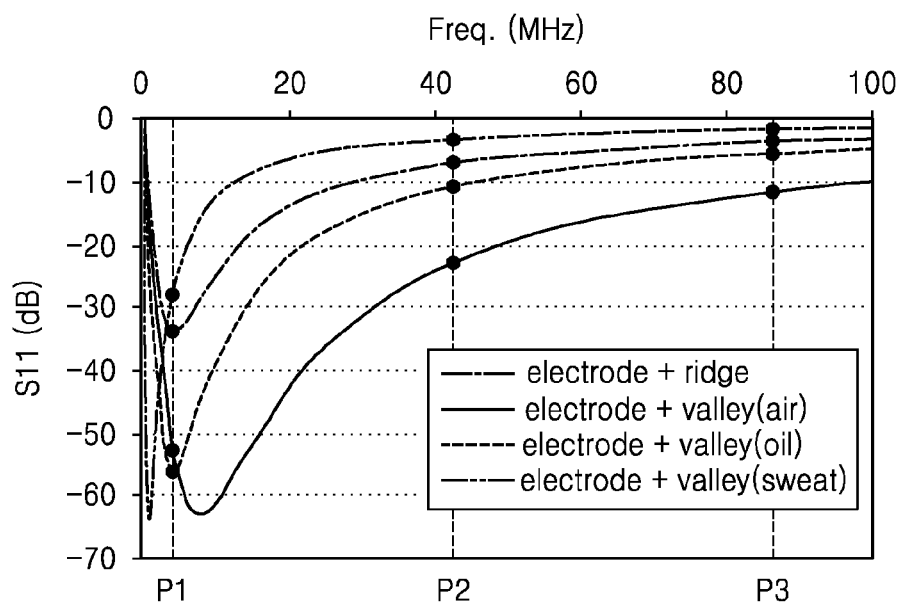
FIG. 5A is a graph showing a multipoint analysis method by using the fingerprint data measured through a fingerprint recognition sensor according to another example embodiment.

FIG. 5A is a graph showing a multipoint analysis method by using the fingerprint data measured through a fingerprint recognition sensor according to another example embodiment.

Referring to FIG. 5A, three points P1, P2, and P3 are set by specifically limiting a particular frequency and then data of the signal return loss value S11 at each point P1, P2, and P3 may be analyzed. The fingerprint information of the object 100 to be tested may be obtained by using the data of the signal return loss value S11 that is analyzed in the above method. The analyzed data is compared with previously stored biometric data and thus identification of the object 100 to be tested may be identified.

Figure 5B:
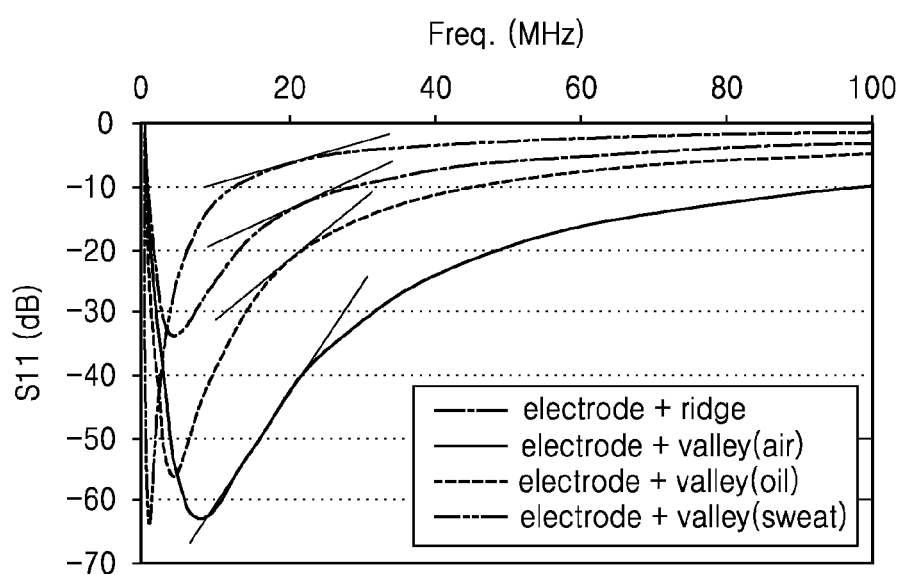
FIG. 5B is a graph showing a pattern analyzing method by using the fingerprint data measured through the fingerprint recognition sensor of FIG. 1.

FIG. 5B is a graph showing a pattern analyzing method by using the fingerprint data measured through the fingerprint recognition sensor of FIG. 1.

Referring to FIG. 5B, it may be seen that inclinations of lines in a particular frequency range of a signal return loss value, for example, in a range of about 20 MHz, are different from one another according to the portion of the object 100 to be tested contacting the pad 12 and the material interposed between the pad 12 and the object 100 to be tested. As such, since a pattern shape of the data that may be obtained by the fingerprint recognition sensor is recognized, the portion of the object 100 to be tested contacting the pad 12 and the material interposed between the pad 12 and the object 100 to be tested may be identified.

In the descriptions with reference to FIGS. 5A and 5B, although the multipoint analysis method and the graph inclination pattern analysis method are exampled as the method for analyzing the finger data of the object 100 to be tested by using the fingerprint recognition sensor according to an example embodiment, inventive concepts are not limited thereto and various analysis methods such as a signal amplitude analysis method, a graph peak point analysis method, a maximum value analysis method, etc. may be employed. The reflection signal data obtained as above is compared with the previously stored data so that the fingerprint of the object 100 to be tested may be identified. Accordingly, a particular material such as oil or sweat may be distinguished, and noise in the biometric data may be removed by correcting, removing, or modifying the data.

According to at least one example embodiment of a fingerprint recognition sensor, since a fingerprint of an object to be tested is analyzed by using the multi-frequency signal, reliability of the fingerprint recognition may be secured.

Also, the fingerprint area of an object to be tested may be identified according to not only the ridge region or the valley region but also the existence of other foreign materials such as sweat or oil.

As described above, various pieces of information data may be obtained by the fingerprint recognition sensor and thus biometric data may be obtained by analyzing the information data in various analysis methods.

The fingerprint recognition sensor according to example embodiments, and the fingerprint recognition system including the fingerprint recognition sensor, may be applied to various personal identification devices and also applied to wearable devices without limitation.

It should be understood that example embodiments described herein should be considered in a descriptive sense only and not for purposes of limitation. Descriptions of features or aspects within each example embodiment should typically be considered as available for other similar features or aspects in other embodiments.

While one or more example embodiments of inventive concepts have been described with reference to the figures, it will be understood by those of ordinary skill in the art that various changes in form and details may be made therein without departing from the spirit and scope of inventive concepts as defined by the following claims.

What is claimed is:

1. A fingerprint recognition sensor comprising:
   a pad configured to apply a first wave signal having multi-frequency characteristics to an object;
   a signal applying electrode configured to transmit the first wave signal having multi-frequency characteristics to the pad; and
   a signal receiving electrode configured to receive a reflection wave signal from the object to the pad based on the first wave signal.

2. The fingerprint recognition sensor of claim 1, wherein the pad has a width smaller than an interval between ridge regions, the ridge regions being protruding areas of the object.

3. The fingerprint recognition sensor of claim 1, wherein the pad is connected to the signal applying electrode and the signal receiving electrode via a pad electrode.

4. The fingerprint recognition sensor of claim 1, wherein the pad comprises:
   a plurality of pads that contact the object.

5. The fingerprint recognition system of claim 1, wherein the pad comprises:
   a plurality of pads that do not contact the object.

6. A fingerprint recognition system comprising:
   a wave generator configured to generate a multi-frequency signal;
   an antenna configured to receive the multi-frequency signal, apply the multi-frequency signal to a user and generate a reflection signal based on the multi-frequency signal being reflected from the user; and
   an analyzer configured to analyze a reflection signal received from the antenna.

7. The fingerprint recognition system of claim 6, wherein the antenna comprises:
   a plurality of pads that contact the user.

8. The fingerprint recognition system of claim 7, wherein the pad has a width smaller than an interval between ridge regions, the ridge regions being protruding areas of a fingerprint of the user.

9. The fingerprint recognition system of claim 6, further comprising:
a band pass filter configured to filter one of the multi-frequency signal and the reflection signal.

10. The fingerprint recognition system of claim 6, further comprising:
an amplifier configured to amplify one of the multi-frequency signal and the reflection signal.

11. The fingerprint recognition system of claim 6, further comprising:
a controller configured to control the wave generator and the analyzer.

12. The fingerprint recognition system of claim 6, wherein the wave generator comprises:
at least one of a plurality of wave generator elements configured to modulate a wave signal.

13. The fingerprint recognition system of claim 6, wherein the wave generator comprises:
at least one of a plurality of wave generator elements configured to generate wave signals having different frequency characteristics.

14. The fingerprint recognition system of claim 6, wherein the analyzer is configured analyze fingerprint data of the user by using at least one of a value of the reflection signal and a signal return loss value.

15. The fingerprint recognition system of claim 6, wherein the antenna comprises:
a plurality of pads that do not contact the user.

16. The fingerprint recognition system of claim 15, wherein the pad has a width smaller than an interval between ridge regions, the ridge regions being protruding areas of a fingerprint of the user to be tested.

* * * * *